United States Patent  
Zach

(10) Patent No.: US 7,784,019 B1  
(45) Date of Patent: Aug. 24, 2010

(54) YIELD BASED RETARGETING FOR SEMICONDUCTOR DESIGN FLOW

(75) Inventor: Franz Zach, Los Gatos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 418 days.

(21) Appl. No.: 11/934,047

(22) Filed: Nov. 1, 2007

Related U.S. Application Data

(60) Provisional application No. 60/863,890, filed on Nov. 1, 2006.

(51) Int. Cl.
G06F 17/50 (2006.01)
G06F 9/45 (2006.01)

(52) U.S. Cl. .................... 716/19; 716/2; 716/9; 716/21

(58) Field of Classification Search .................. 716/2, 716/9, 19, 21
See application file for complete search history.

(56) References Cited

U.S. PATENT DOCUMENTS

| 6,194,104 | B1 * | 2/2001 | Hsu ............................... 430/5 |
| 6,453,457 | B1 * | 9/2002 | Pierrat et al. .................. 716/19 |
| 6,553,558 | B2 * | 4/2003 | Palmer et al. ................. 716/19 |
| 6,961,920 | B2 * | 11/2005 | Zach ............................ 716/21 |
| 7,278,125 | B2 * | 10/2007 | Nojima ........................... 716/5 |
| 7,328,425 | B2 * | 2/2008 | Olsson et al. ................. 716/21 |
| 7,334,212 | B2 * | 2/2008 | Zach ............................ 716/21 |
| 7,403,649 | B2 * | 7/2008 | Cai et al. ..................... 382/141 |
| 7,600,212 | B2 * | 10/2009 | Zach et al. .................... 716/19 |

OTHER PUBLICATIONS www.mentor.com/products/ic_nanometer_design/techpubs/index_noflash_cfm.com , Jan. 2006.
www.synopsys.com/products/ntimrg/abstracts/AccurateParasiticExtraction.html , Feb. 27, 2000.

* cited by examiner

*Primary Examiner*—Jack Chiang
*Assistant Examiner*—Magid Y Dimyan
(74) *Attorney, Agent, or Firm*—Sheppard Mullin Richter & Hampton LLP

(57) ABSTRACT

A method for modifying an integrated circuit design layout is presented and can include placing a plurality of target points in the proximity of a polygon representing a portion of the integrated circuit design; modifying the target point placement for some or all of the placed target points; fitting a curve to the target points; and redefining the portion of the integrated circuit as a contour defined by the fitted curve to modify the design layout. In some applications the modified design layout can be used as a target for an optical proximity correction algorithm or for other purposes.

20 Claims, 18 Drawing Sheets

Original design polygon

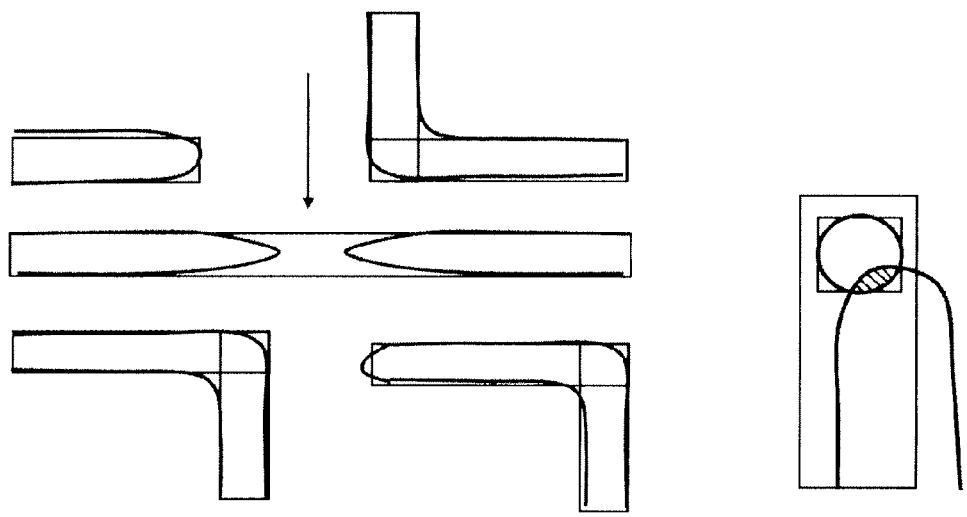
*Fig. 7A*  *Fig. 7C*
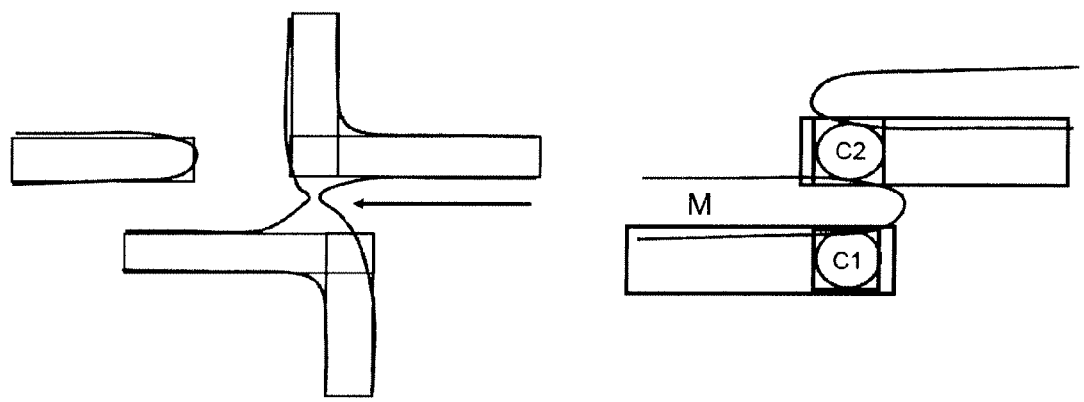
*Fig. 7B*  *Fig. 7D*

YIELD BASED RETARGETING FOR SEMICONDUCTOR DESIGN FLOW

CROSS-REFERENCE TO RELATED APPLICATION

This application claims the benefit of U.S. Provisional Application No. 60/863,890 filed Nov. 1, 2006.

BACKGROUND OF THE INVENTION

1. Field of the Invention

This invention is related to the field of semiconductor manufacturing, and more specifically, some embodiments relate to the creation of contours that represent the final image of the circuit on a wafer in a fashion that optimizes the yield of the circuit.

2. Description of the Invention

Integrated circuits are typically designed by starting with a functional description of the circuit that describes example the logical operations to be performed by the circuit. The design phase typically also includes a step in which the functional requirements are converted into a physical structure representation. Ultimately, the circuit is embodied in a physical structure that typically includes a number of layers, each layer having patterns which, when laid upon one another form the circuit. The patterns within each layer are most commonly represented through a GDS-file that primarily consists of rectangles or polygons. This representation is then used to perform a variety of checks that validate the desired functionality of the chip based on its structure as described by a GDS. However it is well known that these rectangles are a poor representation of the final shape of these structures on a wafer, especially in the subwavelength lithography domain, i.e that domain where the patterns formed are smaller than the wavelength of light used to image them. Accordingly, there are differences between the GDS representation and the actual physical embodiment of the circuit.

To aid in this process, several suppliers offer tools that predict wafer contours and are able to use them for functionality checks such as parasitic extraction. Examples of such tools include: The Mentor Technical Library: Computation of parasitic capacitances of an IC cell in accounting for photolithography effect; and The Synopsis Technical library (V. Malhotra et al. "Accurate parasitic extraction for Subwavelength Lithography").

Another approach to optimization is one that optimizes the yield of a circuit in manufacturing by modifying the design to accommodate contour variations. This concept is generally defined as DFM (Design for Manufacturing). Yield generally refers to the portion of the total number of manufactured wafers (or die thereon) that satisfy to an adequate extent the functional or performance criteria established therefor. As the size of the features printed on a wafer has become smaller and smaller it has become increasingly more difficult to manufacture die with high yield. One of the factors with which the yield may be modified is through changes in the design. Common examples are modifying polygons to improve the printability by eliminating bridging and pinching sites. Yield of a layout may be improved by adding redundant vias so that electrical connections remain even if one of the vias in the connection fails. Overall chip leakage may be improved without significant impact on the highest possible chip frequency by selectively biasing gates.

A large number of companies are present in the EDA (electronic design automation) domain that have made public announcements on software for yield based design modifications. These companies are fore example Cadence®, Mentor Graphics®, Synopsys®, Takumi Technology, BLAZE™ DFM, Pyxis Technology, and Ponte, among others. A number of DFM tools are available by these companies. Cadence®, provides many EDA tools including a LPC (lithography process check) tool, CAA critical area analysis tool and CMP modeling to capture systematic metal thickness variations.

Mentor Graphics®, a provider of a variety of EDA tools has a product called Calibre® DFM. This program provides both yield analysis as well as yield improvement capabilities. For example the tool analyzes the exposure of the layout to via fails such as those where the contact connecting two layers is not patterned properly. The program automatically inserts redundant vias to minimize the exposure of the circuit to this yield loss mechanism. It is also capable of expanding and modifying polygons to provide for example better metal line via coverage. The program also analyzes to what extent a design complies with recommended design rules. These recommended design rules are put forward by the semiconductor manufacturer in an effort to improve yields. Typically, recommended ground rules are less aggressive and therefore less prone to failure during the manufacturing process.

Synopsys®, a provider of EDA tools uses a program called PrimeYield LCC to detect and correct potential manufacturing issues. The program provides an LCC (lithography compliance checker), model-based chemical mechanical polishing (CMP) and CAA, (critical area analysis). LCC provides CMP (checker for CMP variability). Tools for checking the severity of lithography and CMP induced variations. CAA critical area analysis checks for defect sensitivity of a layout. LCC detects potential lithography problems by calculating the expected wafer contours under different process conditions and detecting potential bridging and pinching sites. The tool also possesses an auto correction tool which automatically deals with some of these issues for example by adding space between lines, moving edges or corners. The CMP performs a model based analysis of metal layers for layout induced CMP variations that result in systematic line thickness variations. The resulting thickness map may be fed into the parasitic extraction tools for a more precise analysis of the chip performance. The CAA tools perform a analysis of the sensitivity of the layout to random defects that may cause opens or shorts.

Takumi Technology, a DFM startup provides tools for lithographic hotspot detection. It also provides a tool that detects layout that exhibit a high risk of failure to various yield loss mechanisms that include lithography driven fails. The tool provides repair suggestions, designs can also be fixed using an automatic repair tool. Blaze™ DFM takes into account timing and leakage considerations. It provides an annotated GDS for use in commercial OPC programs. Yield is improved for chips with stringent power consumption requirements. Ponte provides a model based yield assessment of a design.

SUMMARY OF THE INVENTION

In accordance with one embodiment of the invention, a yield-optimized layout is provided by way of a plurality of target points, some or all of which have been modified to optimize the layout to some extent. In one embodiment, a system, method and computer program product are provided to modifying an integrated circuit design layout, preferably to yield some level of circuit optimization. In one embodiment, this is accomplished by placing a plurality of target points in the proximity of a polygon representing a portion of the integrated circuit design; modifying the target point placement for some or all of the placed target points; fitting a curve to the target points; and redefining the portion of the integrated circuit as a contour defined by the fitted curve to modify the design layout. In one embodiment, the modified design layout is used as a target for an optical proximity correction algorithm.

The initial placement of the target points can be made such that they appear on the perimeter of the polygon representing the portion of the integrated circuit design. Accordingly, modifications to that placement will reflect changes in contour in magnitude or direction from the original polygon representations. Placement modification can be made by fitting the target points to locations based on yield measurements and can be performed automatically or based on user input. In one embodiment of the invention, the modified target point placement is displayed within the layout viewer or layout editor that the designer has used to load the initial design. The modified layout can than be display on a graphical output device such as a display or printer. The designer may then accept the proposed modifications. In another embodiment of this invention the final target point placement is provided to the parasitic extraction tool. In this case the target points are converted to GDS polygons by using the target point coordinates as the corner points for the polygon. The more accurate values for the parasitic capacitance and resistivities enable an improved timing analysis.

In another embodiment the target points can be used directly as the input to an optical proximity correction program. In this case the original design GDS polygons may be used as the starting point for the mask optimization, and the tool can uses target points to define the final wafer target.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIGS. 7A-D illustrate examples of various failure modes.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE PREFERRED EMBODIMENTS

The present invention can be implemented in one embodiment to provide an optimization step in the design flow that converts the original design polygons into contours. The contours can be modified through an optimization process in an attempt to improve the manufacturability of the actual contour. The resulting contours can, for example, in one embodiment, provide a means to communicate the final, yield-optimized contours to the design team, allow the final design checks to be made with realistic contours, and use these contours as the goal for OPC or PPC (optical/process Proximity correction).

Figure 1:
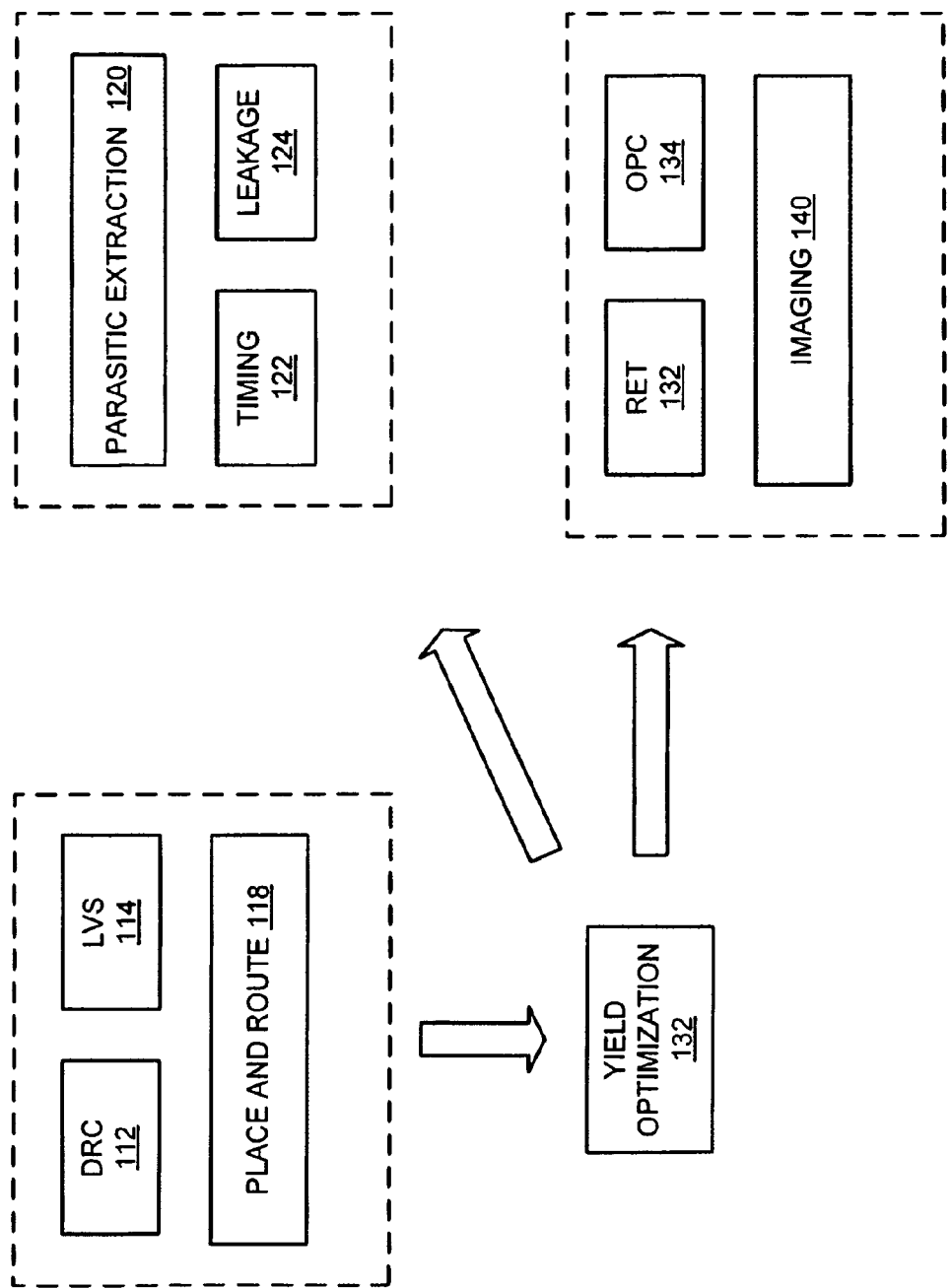
FIG. 1 illustrates an example of an optimization process according to one embodiment of the present invention.

FIG. 1 is a diagram illustrating an example process for optimization in accordance with one embodiment of the invention. Referring now to FIG. 1, an initial design process is conducted in which a layout is generated. This initial process can include, in one embodiment, physical verification steps such as, for example, design rule checks (DRC) 112, layout versus schematic checks (LVS) 114 or other verification processes. Design rule and layout checks can be used to help verify whether the proposed layout satisfies a series of or desired circuit parameters or characteristics.

Once verified, layout and routing tools can be used to create an electronic representation of the design layout as illustrated by block 118. In one embodiment, this can be in the form of a GDS (Graphic Data System) file, although other representations can be used. Although the invention may be described herein in terms of a GDS file format, one of ordinary skill in the art will understand after reading this description that other formats or files can be utilized.

Once the layout is generated, the process can continue with optimization as illustrated by block 132. In one embodiment, optimization can involve placing a set of target points on the design polygons and then moving the target points in accordance with yield or manufacturability considerations. The shapes represented by the modified target points might then be used, for example, for visual review by the designer or as input to the parasitic extraction 120, timing 122 or leakage 124 analysis and verification. In a further embodiment of the invention, the target points may be used as an input to an optical proximity correction (OPC) routine 134, which, along with resolution enhancement techniques (RET) 132 and mask generation or imaging 140 are part of the manufacturing process.

In one embodiment of the invention the movement of the target points can be calculated from a yield function, and the yield function can be calculated using design polygons on at least one layer. In another embodiment, the target point placement can be calculated using the actual target point placement rather than the design polygons.

The movement of target points might be accomplished in a single step or, alternatively, through a multiple-step optimization process. Multiple step optimization processes might be more likely to be implemented when the movement of target point placement is based on the actual target point placement rather than the design polygons. The movement of target points might be determined by intralevel fail mechanisms that might be most commonly caused by overlay issues. The target point placement might further be derived from intralevel fails, most of which are related to lithographic printability concerns.

Figure 2:
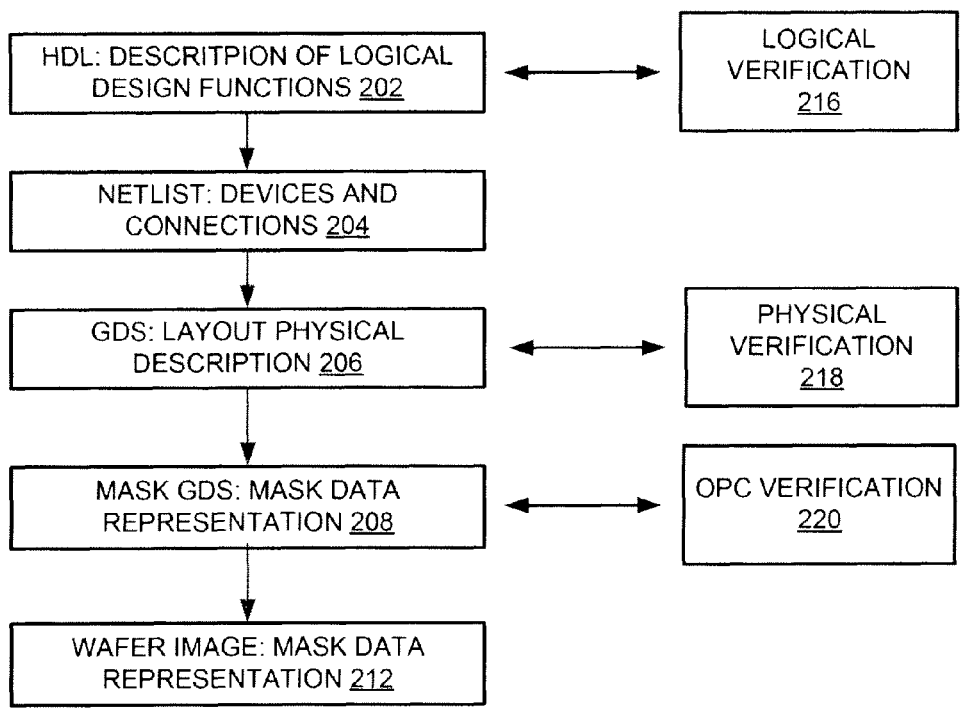
FIG. 2 illustrates an example logic design flow process according to one embodiment of the present invention.

FIG. 2 is a diagram illustrating an example of a standard logic design flow. In this example, chip design starts with a description of the desired or specified logical functions 202. For example, a logical RTL description can be provided. The logical description might be specified, for example, using a hardware description language, or (HDL), such as, for example Verilog or VHDL, although other description languages can be used. The logical functionality of the chip may be checked at this stage as illustrated by block 216.

At 204, the logical design is converted into a into a discrete netlist of logic-gate (boolean-logic) primitives. The netlist provides a description of gates, resistors and electrical connections required to implement the logical functionality. This description of the layout is then converted to a physical description, which, as noted above, might be in the form of a GDS or GDS-II file, although other formats are available. For an ASIC design flow this conversion might be accomplished, for example, through the use of place and route tools as well as an ASIC library. In an ASIC library basic logical functions are identified with a physical design that describes how the logic function is to be implemented on the wafer. Most commonly this library consists of a GDS-II file, which describes the physical structure on a multitude of levels. The place and route tool selects the library elements and assigns a physical location to the cell in the final layout. Subsequently the individual cells are connected according to the functional description of the circuit. The final description of the physical structure of the chip is essentially a series of multiple layers such as active area, gate, First contact and first metal as well as a series of routing layers consisting of wires and contacts. Physical verification 218 can be performed on the physical layout such as, for example, DRC checks and parasitic extractions. The shapes in the GDS file are represented through rectangles or polygons, preferably with a relatively small number of vertices.

This GDS file is then used to communicate the specified structure for manufacturing. The multiple layers present in the GDS are converted to a series of mask levels as illustrated in block 208. These mask levels represent the photolithography steps in the overall process flow. In most contemporary applications, the desired feature dimensions are comparable to or smaller than the wavelength used for exposing the mask layers. Accordingly, the lithographic process suffers from distortions that affect the shape of the elements created on the wafer. In other words, the polygons placed on the photomask do not image as desired on the wafer. Accordingly, a process generally referred to as OPC (optical proximity correction) is used to modify the polygons on the mask in such a fashion as to counteract any optical and other process related (etch) distortions. This is illustrated by block 220. The resultant corrected data yields a mask data representation 212 that can be used to create the photomask or other pattern generating tool.

In spite of these corrections, it is well known that the shapes that can be printed on the wafer differ significantly from the shapes present in the GDS file. For example, the polygons in the GDS file denote traces with straight lines and squared corners, whereas the light that bends around the photomask features tends to create rounded corners and lines with some curvatures. Furthermore, the actual shape and placement of polygons is not necessarily optimized for manufacturing. In one respect, manufacturing considerations can generally be expressed in terms of yield, which describes what percentage of die that exhibit the desired electrical characteristics, usually to within a desired degree of tolerance.

Figure 3:
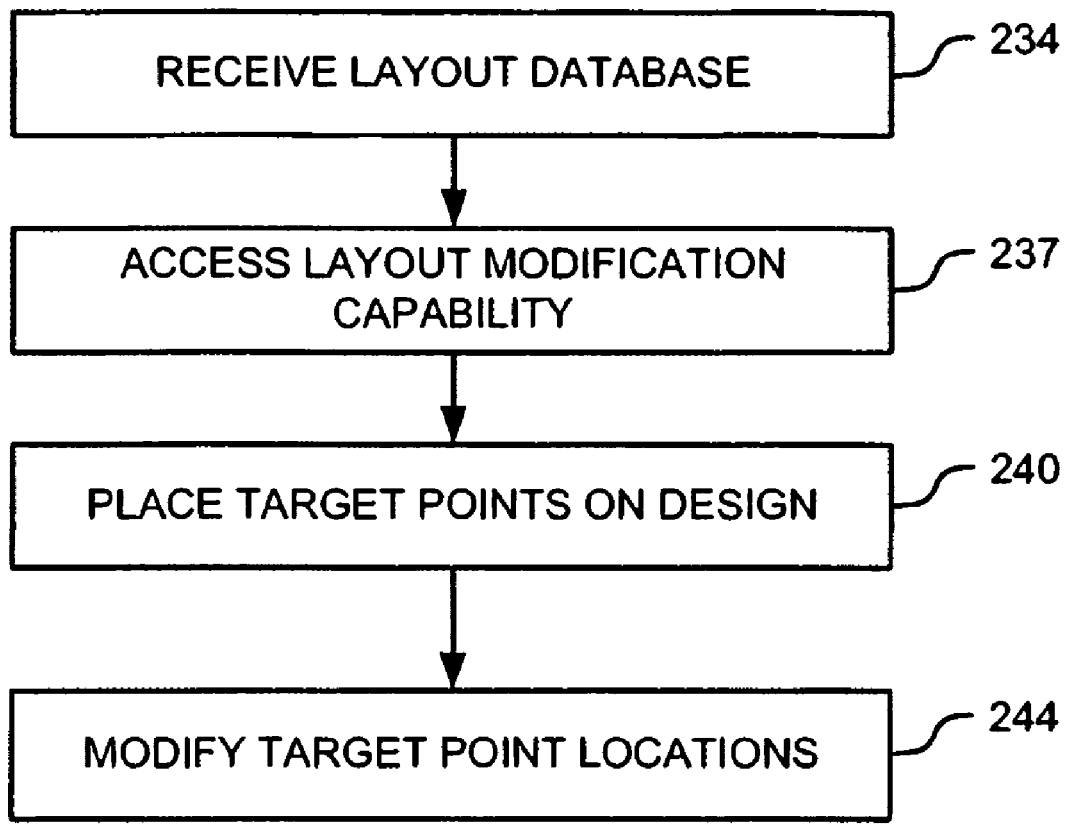
FIG. 3 illustrates an example of a design process in accordance with one embodiment of the present invention.

As noted, in one embodiment of the invention, target points are placed and used to adjust the shapes of the contours laid out in the wafer. FIG. 3 is an operational flow diagram illustrating an example process in accordance with one embodiment of the invention. Referring now to FIG. 3, at 234 the tool receives a database representation of the circuit, such as, for example, a GDS-II file or an OASIS database. This database contains the information on the physical structure of the chip as a function of layers. As mentioned above it can also provide the basis for a variety of verifications that can be executed on the layout including a visual review by the designer. This information can be loaded onto a computer and suitable means provided to display the original design data to the user. Commercially available programs that provide such capabilities are for example the Virtuoso editor offered by Cadence Design Systems, Inc., although other like tools can be used.

At 237, a layout modification capability is accessed. For example, software layout modification tools can be provided. In one embodiment of the invention, the yield-based layout modification capabilities can be accessed through a menu button incorporated into the computer program that displays the original GDS or OASIS database. In one embodiment, the layout modification tool can be configured to provide the ability (for example, through a variety of menus) to select the various yield mechanisms that are deemed important for achieving higher manufacturability. This selection might be guided, for example, by information transferred to the user from the wafer manufacturing facility in the form of recommended settings or, for example in the form of an encrypted model file.

Figure 4:
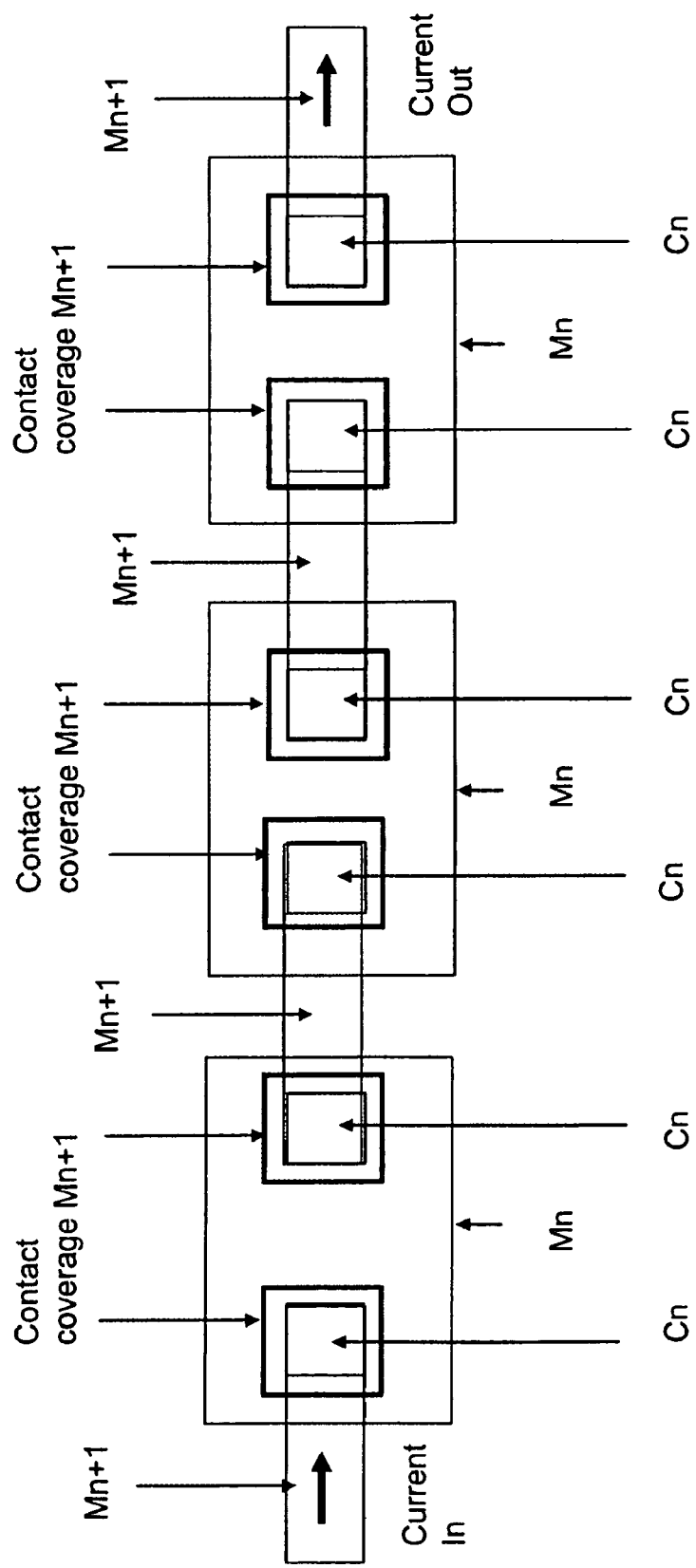
FIG. 4 illustrates an example of a contact chain according to one embodiment of the present invention.

In addition the user, such as, for example, a fabless semiconductor company may have determined this information based on the electrical and possibly structural analysis of test chips that they have run in the wafer manufacturing facility under consideration. For example the yield issue might be determined by the extent to which a metal line end covers an underlying contact. A test chip for evaluating such a yield mechanism might include a test macro typically referred to as a contact chain. FIG. 4 is a diagram illustrating an example of such a contact chain. Shown in this figure is a circuit that allows an assessment of the required metal contact coverage through a electrical continuity measurement. The circuit is built on three layers, Metal n (Mn), the metal layer above (Mn+1) and a contact in between. The design is done such that the contacts (Cn) landing on Mn have a large enough metal border around such as to provide good connection under all circumstances. However the connection between Mn+1 and Cn is designed such that a pad of variable size (metalcoverage Mn+1) provides the overlap between Mn+1 and Cn. For the purpose of such experiments, a series of such circuits might be used where the size of the contact coverage pad is varied. In a perfect manufacturing process, this circuit would conduct current independent of the size of the metal coverage. However in a non perfect manufacturing environment where misalignment occurs between the metal layer Mn+1 and the contact layer Cn, this circuit may not be able to conduct current depending on the contact shapes and sizes.

On each test chip, a set of these circuits can be present with varying metal coverage size. The electrical continuity measurements can be provided based on a large number of chips and thus provide a percentage of circuits with electrical continuity as a function of metal overlap. The yield as a function of metal coverage size may be determined and used to measure the significance of the yield loss mechanism. Accordingly, this can provide a numerical description on the behaviour of the yield loss. Therefore, in addition to selecting the individual yield mechanisms for each yield mechanism, a variety of parameters can to be chosen that describe the characteristics of the yield loss mechanism. Similar to the information on what yield loss mechanisms are present, this information may be provided to the user directly by the wafer fabrication facility or the user might determine it through test chips that have been run in the facility and tested.

Figure 5A:
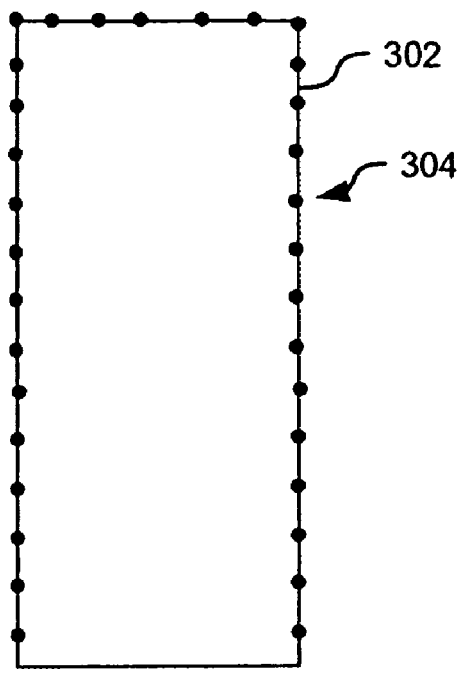
FIGS. 5A-B illustrate examples of target point placements according to one embodiment of the present invention.

At 240, target points are placed onto the design. One example of this is illustrated at FIG. 5A, wherein, target points 304 are placed on the layout design. Shown is an example of a design polygon 302, which in this particular case is a rectangle that may be described by its four corner points. Target points 304 are in one embodiment additional vertices added to the polygon. These vertices can be used to evaluate the yield function, an example of which is outlined below. In the illustrated example, the number of target points 304 is substantially larger than the number of vertices present at the original polygon. Accordingly, through the additional resolution provided by the additional target points 304, a more refined representation that is better suited to accommodate manufacturing concerns can be achieved. Although any number of target points 304 can be utilized, a practical upper limit on the number of target points 304 is in one embodiment defined by the limited resolution of the exposure system. For example, the Nyquist sampling frequency 0.25*NA/k where NA is the numerical aperture of the exposure system, and k is the wavelength of light used for imaging.

Placing target points on only one design layer may not be sufficient. This might be true, for example, in the case of contact to metal line end overlap. In such cases, it might be beneficial or necessary to place target points on the n-th metal layer (Mn), the contact Cn and the (n+1)th metal layer. This might be done to allow, for example, simultaneous movements of target points on more than one layer and thus provide additional possibilities in terms of addressing yield issues.

In yet another embodiment, the user may restrict the area to a particular domain within the design. For example if the user has loaded the design into the design platform program, he or she can select a region of interest within which the yield-driven layout modifications can be made and thus the target point placements are being executed. Other approaches that may reduce the runtime of the yield optimization may be based on identifying critical portions and the corresponding sections within the netlist and execute the yield optimization only on those parts of the layout.

Figure 5B:
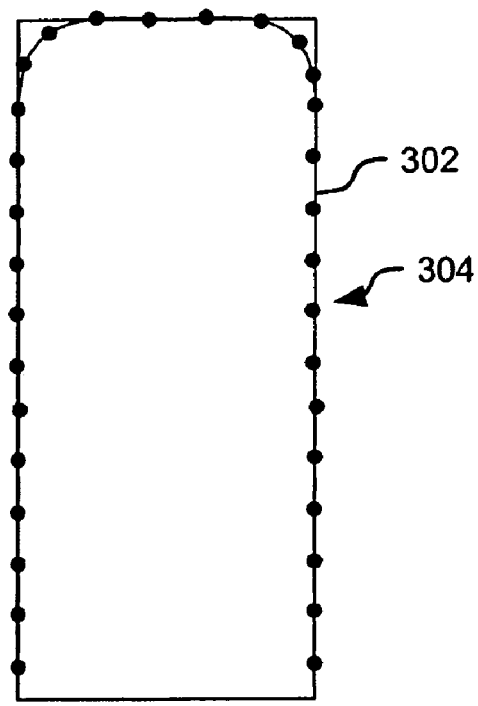

In yet another aspect of the invention, the target points may be moved from the original target polygons. FIG. 5B is a diagram illustrating an example of moving target points away from the original target polygons in accordance with one embodiment of the invention. In the illustrated example, the target points are moved away from the original design polygons primarily in the vicinity of the corners and primarily in small steps. This procedure might be implemented, for example, to account for inabilities of optical systems with limited bandwidth to image an ideal or perfectly square corner.

This corner rounding however may not be necessary at all for the case of double patterning approaches where a single feature is created through two subsequent patterning steps. In these cases substantially sharper corners can be achieved and the corner rounding radius may be limited by the corner rounding induced by a non optical effect for example the corner erosion in an etch process.

At 244, one or more of the target points are moved to a location such that the outline of the shapes on wafer, described by the succession of all target points, exhibits some level of improved manufacturability. A variety of approaches might be implemented to determine the target point movements. In one embodiment of the invention, the amount of movement may be determined in an iterative fashion. The target point placement for the first iteration is determined. For example the target point movement might be accomplished as set forth above at 240. Based on the known target point distribution, a correction is calculated for each target point. The process may be stopped if the movement for any given target point has exceeded a defined maximum amount, the total number of iterations has exceeded a specified quantity, or the calculated movements are small relative to a user defined tolerance.

In another embodiment, the magnitude and direction by which the target points should be moved may be determined using a yield function. In one embodiment, a yield function might be described as a function defined within the two dimensional space given by the layout, wherein each point within the layout has a value assigned to it between 0 and 1. Low values indicate positions that result in low yield if a target point falls on this location, while higher values indicate preferred locations for target points as the yield is high.

Figure 6A:
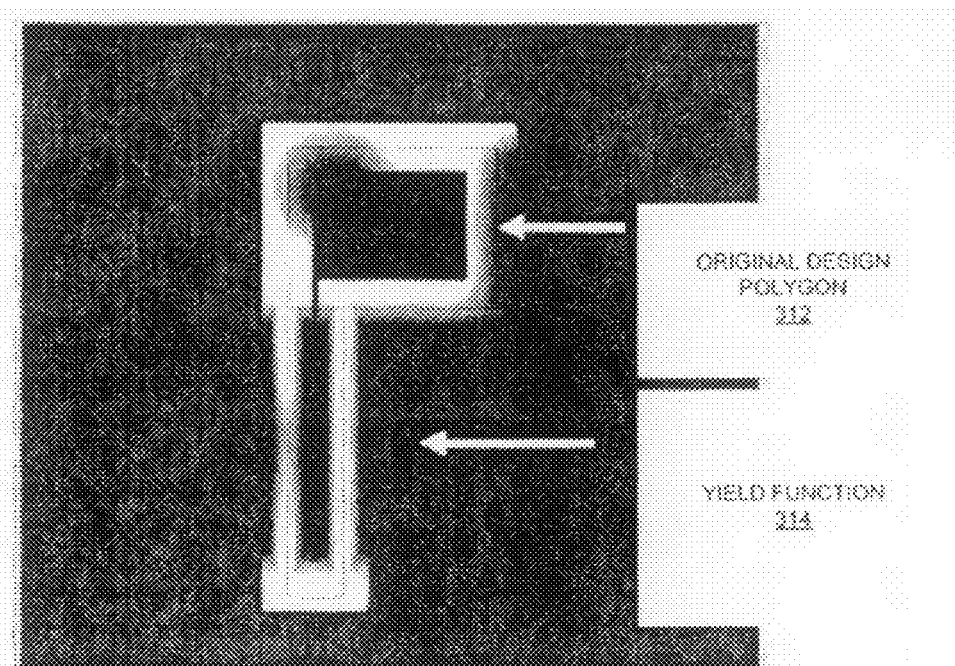
FIGS. 6A-B illustrate example yield functions implemented according to embodiments of the present invention.

FIG. 6A is a diagram illustrating an example yield function in accordance with one embodiment of the invention. The example illustrated in FIG. 6A provides an example of a non-iterative approach for determining a yield-optimized contour. In this example, the original design polygon 312 is shown with a dark line. Superimposed on this design polygon is the yield function, the values of which in this example are represented on a gray scale where white areas indicate regions of high yield, and dark regions indicating regions of low yield.

In accordance with the process described above, in one embodiment target points 304 are placed onto this original design polygon. In this particular example it is advantageous to include the corner rounding aspect. Once the target points 304 have been placed, one can approximately fit a curve to the target points 304 by, for example, determining the normal to the target points. Furthermore for each target point a maximum distance can be defined over which the yield function will be sampled. This distance may be defined by the user and might be chosen to help ensure that solutions are not too far from the original design.

Figure 6B:
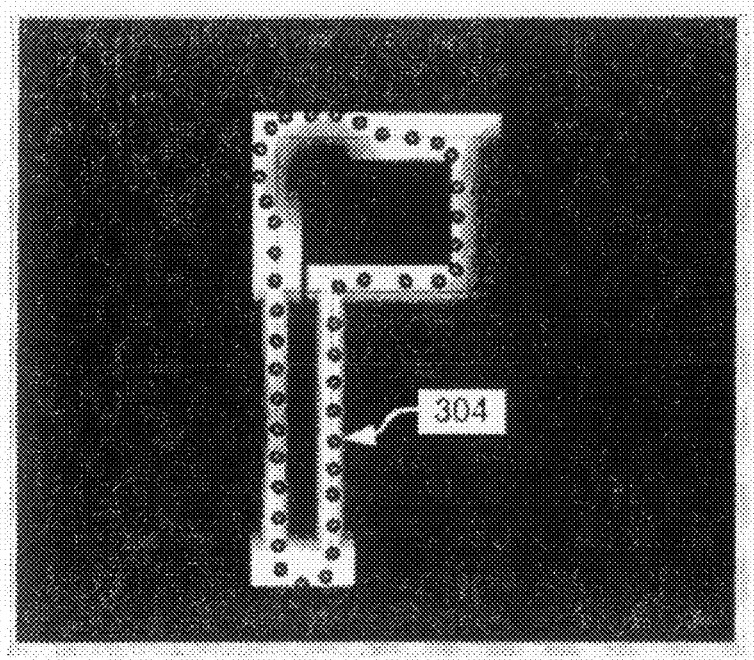

The search distance and the direction of the normal define a one-dimensional portion over which the yield function is sampled for the individual target point. Within this one-dimensional region, the global maximum of the yield function is determined through methods known to those skilled in the art. If no significant yield improvement can be achieved over the value of the yield function at the starting position, the target point 304 remains at the original position. For each target point 304 individually the global maximum can be created. In this fashion a final target point 304 distribution can be calculated without performing any iterations. An example distribution is shown in FIG. 6B, where target points 304 are illustrated as having been moved in some regions to reach the global maxima of the yield distribution.

Semiconductor circuits typically include wiring layers to provide electrical continuity between certain parts of the circuit while maintaining electrical separation between others. Therefore, the main failure mechanisms associated therewith are electrical opens and shorts. These failures can be described as interlevel failures and intralevel failures. Interlevel fails electrical failure. Examples are insufficient contact coverage by a metalization layers (creating opens), and metal to contact shorts. Examples of these printing issues are shown in FIGS. 7A-7D. FIG. 7A illustrates an example of an instance where an electrical open is created in a conductive line that does not print properly. FIG. 7B illustrates an example where a bridge or short is created between two parts of the circuit that are not supposed to be connected. FIG. 7C is an example of an interlevel failure due to misalignment between the metal and contact layers. In this example, there is insufficient overlap (indicated by the cross-hatched area) between contact and metal line resulting in too high of a resistivity for the connection. FIG. 7D represents an example of an interlevel failure where, due to misalignment, two parts of the circuit that were not originally connected (contact C1 and contact C2) are now connected through the misaligned metal line M.

Figure 8:
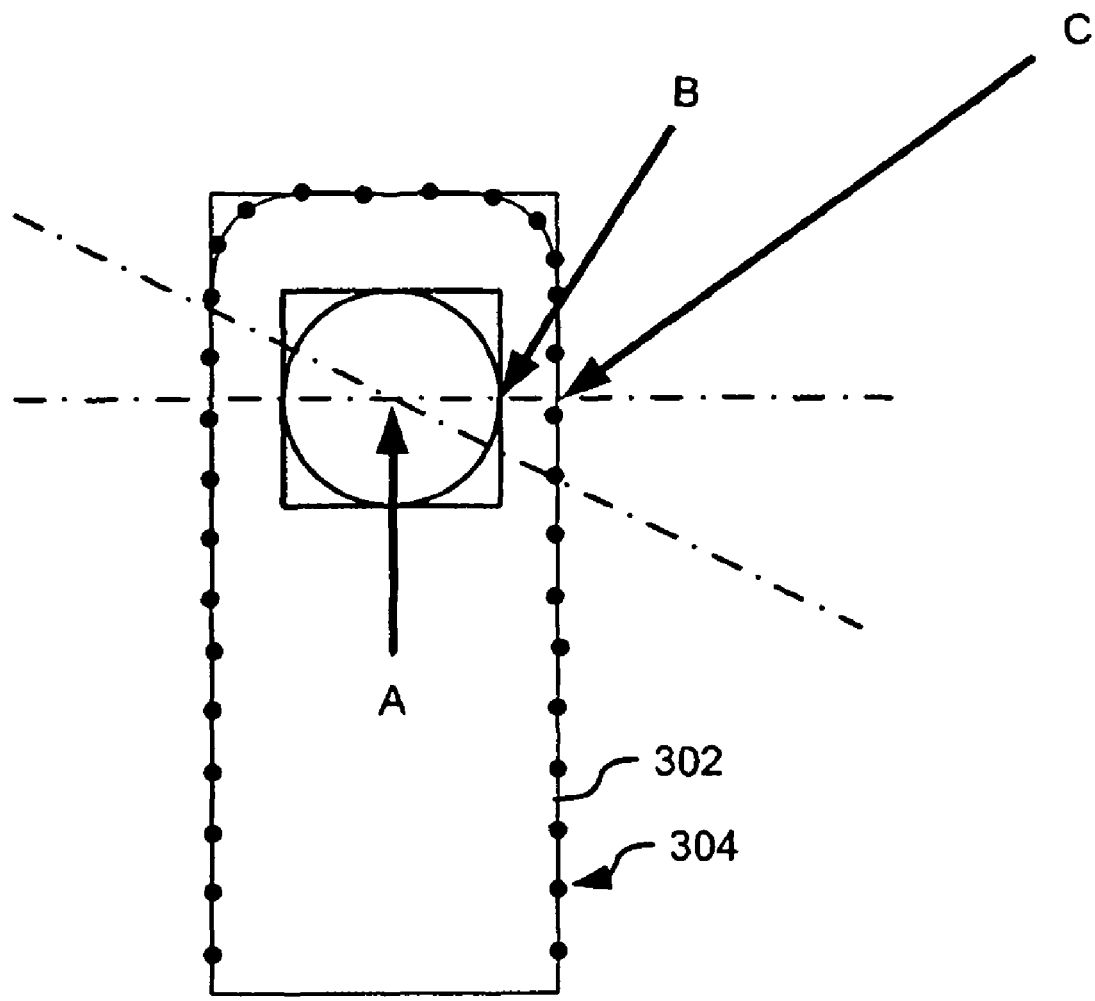
FIG. 8 illustrates an example of target point placement according to one embodiment of the present invention.

The first example being discussed is that of a metal line end covering a contact, an example of which is shown in FIG. 8. The metal line and the contact are originally represented by polygons. In this example, the contact is represented by a circle shown an the figure. This representation of the contact shape is more representative of the final shape present on the wafer. Without loss of generality, the diameter of the contact may be chosen to represent the actual target dimension of the contact on wafer. Shown in the figure is a case where the diameter of the contact is equal to the diameter of the drawn contact.

As described, target points 304 are placed on the polygon 302. This can be done, for example, as described above. The corners of the target polygon are rounded accordingly. The spacing of the target points may be chosen based on practical considerations (such as, for example, an amount of available storage space), but are preferably dense enough to provide a good representation of the resultant curvate. Also included in the figure are two arbitrarily selected cutlines illustrated as dashed lines. These are included for illustrative purposes.

The functional purpose of the example element shown is to provide an electrical connection between the contact and the metal line in the actual physical structure. This purpose is achieved by providing sufficient overlap between the metal line and the contact. Process variations that might interfere with this goal is the inability to achieve perfect alignment or the inability to exactly image the desired polygons. Overlay refers to a non perfect alignment between two processing layers, which is typically driven by the limited capability of the exposure system to perfectly reposition a subsequent exposure relative to a prior on.

Figure 9:
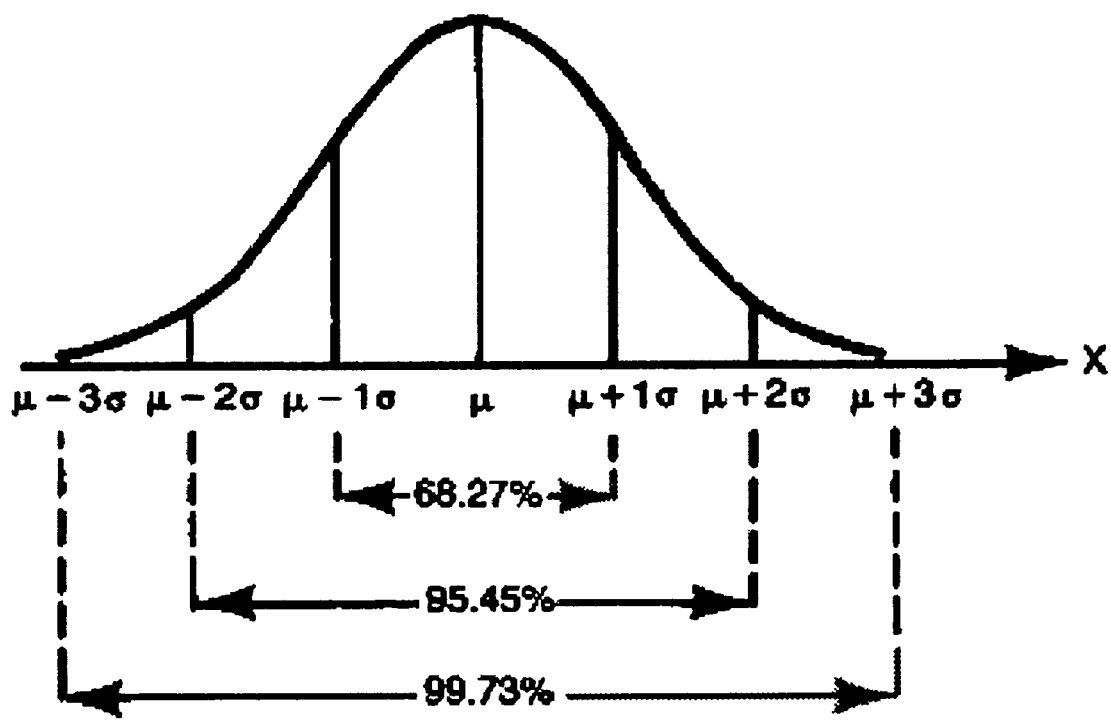
FIG. 9 illustrates an example overlay error distribution in accordance with one embodiment of the invention.

FIG. 9 provides an example of a typical error distribution for overlay. The x axis represents the amount of displacement (in a given direction) between the ideal locations of metal and contact. The y-axis represents the probability with which this displacement occurs under normal processing conditions. Shown in this example is a Gaussian distribution, even though the procedure described here may be extended to other possible distributions. For simplification, we further assume that the probability distribution does not change as a function of the direction within the plane. This assumption is generally not valid as overlay errors for step and scan system tend to be different in the direction of the scan vs. in the direction perpendicular to the scan. However, the procedure described below can be extended accordingly to include such directional non uniformities.

Figure 10:
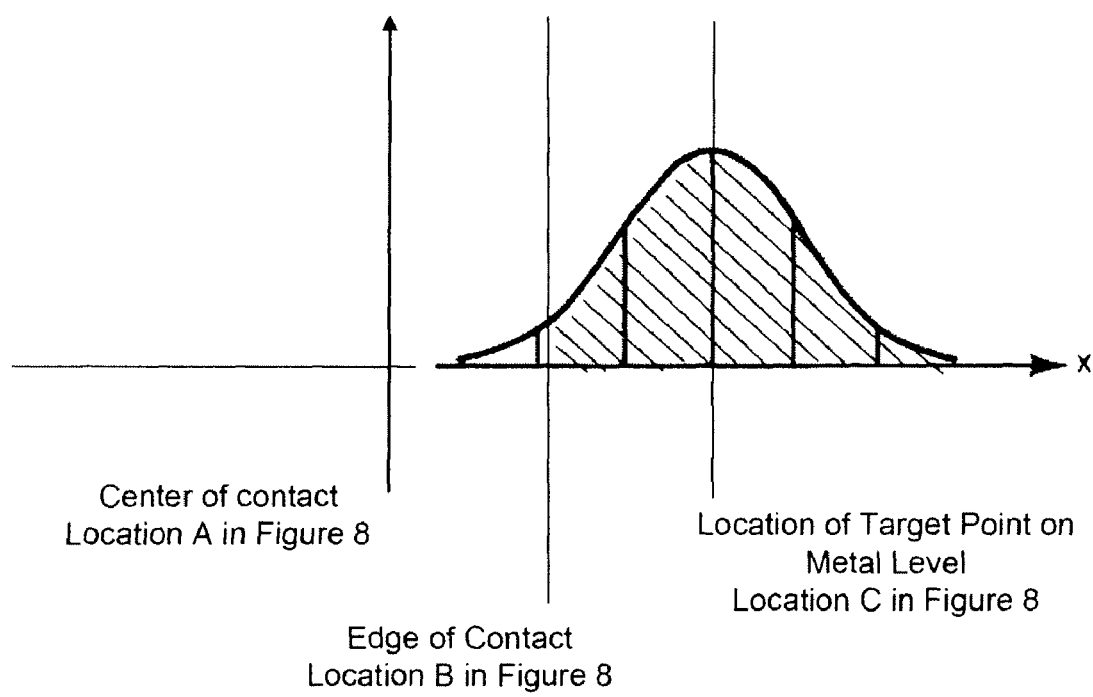
FIG. 10 illustrates an example of cutlines shown in FIG. 8 depicted with an error distribution.

To simplify the process of constructing the yield function, in one embodiment it is reduced from a two-dimensional problem of the overlap between the metal line and the contact to a one dimensional one between a target point and the edge of the contact. FIG. 10 is a diagram illustrating an example wherein one of the cutlines shown in FIG. 8 is depicted together with the location for the center of the contact A, the edge of the contact B and the position of the metal line contour C. Also shown in this figure is an example Gaussian probability distribution for an overlay error that moves the metal edge relative to its ideal location. The probability that an overlay offset is small enough such as to not move the metal edge at the location of the contact edge is given by the area under the probability curve extending form the right to point B. If the overlay error is larger than that in this example it is assumed that the circuit fails. This assumption is a conservative one, it postulates that failure occurs if any portion of the metal contour crosses inside the contact due to misalignment. Somewhat less stringent criteria can be implemented such as, for example, by using a minimum overlap area represented by a contact with a smaller radius.

The yield, as a function of the distance between the metal edge and the contact edge therefore is the cumulative probability, represented by the hatched area under the probability curve, extending from the right up to the intersection marked by location C. As the location of the metal boundary moves away from the contact border, the cumulative probability increases corresponding to a higher yield. As the metal boundary moves closer to the contact the cumulative probability increases or in other words the probability for fails increases. For the case of a Gaussian distribution the resulting cumulative distribution can be described by an error function:

$$Y(x) = \frac{1}{2}\left(1 + erf\left(\frac{x-\mu}{2\sigma}\right)\right)$$

Where $\mu$ is the position of the contact edge, x is the position of the metal edge along the cutline and the positive direction is from the center of the contact to the edge of the contact.

In order to find the 2 dimensional distribution of the yield function we create:

$$Y = Y(r,\Theta) = Y(r) \cdot y(\Theta)$$

Where $Y(r)=Y(x)$, describing the radial part of the yield function and $y(\Theta)$ is the angular part of the yield function. A simple implementation of $y(\Theta)$ is to set it to a constant term. The combined yield function for an assembly of contacts may be obtained by multiplying the contributions of the individual contacts.

It should be noted that in one embodiment, in the absence of more detailed data, for example knowledge about the actual overlay distributions, a more empirical approach can be used. In this case the yield function $Y(r)$ may be used as such and the parameters (location of the 50% point and spread sigma of the distribution) may be adjusted by an end user to suit their needs.

Figure 11A:
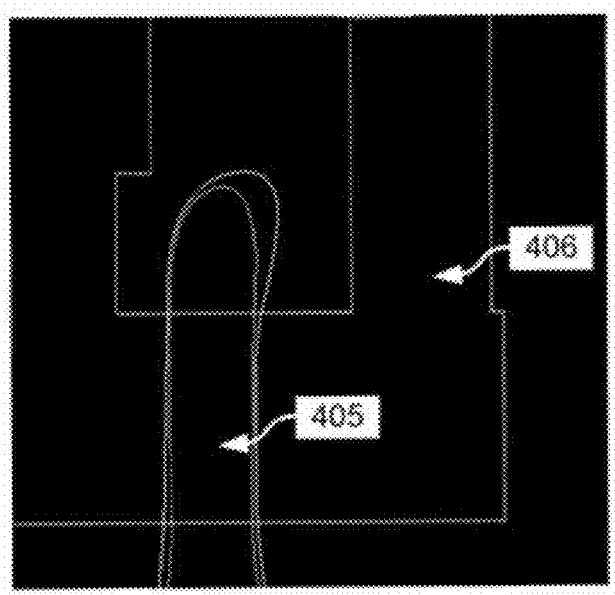
FIGS. 11A-B illustrate examples of gate overlay representations generated by yield functions in accordance with embodiments of the present invention.

Another example of an interlevel yield issue that can be used to define a yield function is illustrated in FIG. 11A. This example shows the intersection between gates 405 and the active region 406. In many designs, performance is strongly dependent on the relative strength of the transistors. Both the width as well as the length of the transistor contribute to this strength. Due to the curved nature of the transistor shape, the average width of the transistor may change dramatically. For example if the overlay error between active region 406 and gate 405 is such that the curved end portion of the gate 405 overlaps the active region 406, the average transistor width will be significantly larger than the value achieved if the relative placement of gate and active region is at the nominal condition. Furthermore of the two gate contours 405 illlustrated, the one that shows almost no curvature up to the end is significantly less sensitive to overlay. Therefore this gate shape is more desirable from a process control perspective and the corresponding circuit would be expected to exhibit higher yields with this shape.

Figure 11B:
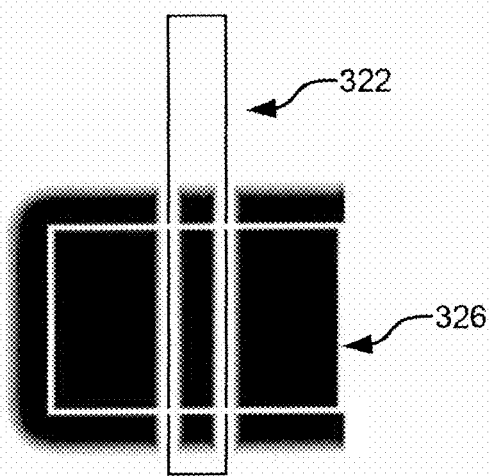

A further consideration in this example is that the best yield will be accomplished with a gate shape that is fairly narrowly bound by the desired gate width. This yield mechanism may be captured in one embodiment by a yield function that is schematically shown in FIG. 11b. In this case an intersection between an active region 322 and a gate 326 are displayed. Superimposed on this layout is a yield function shown as a grayscale image with white regions representing high yields and dark regions representing low yields. As can be seen by this example, the yield function exhibits a narrow bright region in the vicinity of where the gate intersects the active region. The bright region is narrow indicating that the active gate cannot tolerate large deviations from its nominal value without rapidly decreasing. Furthermore the bright region extends in a straight fashion beyond the active region thus accommodating the need for straight gate distances beyond the active region to accommodate for misalignments. This yield function may be created by determining those edges of gate, which lie over an active area expanded, for example by the overlay tolerance. These sections of the line may then be broadened through a Gaussian function that represents the allowable gate tolerance. Significantly away from the active region, the yield is uniformly high as this failure mechanism is only restricted to the immediate (as compared with the overlay tolerance) neighbourhood of active.

FIG. 11B incorporates another yield mechanism related to the relative overlay between gate 322 and active region 326. If the misalignment between active region 326 and gate 322 is significantly large the tip of the gate 322 falls within the active region 326. In this case the gate 322 is no longer functioning properly as it can no longer completely shut of the current flowing through the diffusion region even if the transistor is turned off. Furthermore if regions of the gate that are intended as poly wiring overlap the diffusion region, the capacitive coupling between the gate and the diffusion region increases and thus the speed of the circuit may be reduced, thus once again reducing chip yield. This yield mechanism my be captured by creating a yield function that has low values in the vicinity of the active region and increases over a certain distance away from the active region in a fashion similar to the approach described for the metal line end to contact overlap. To create such a yield function that qualitatively captures this failure mechanism one may take the polygons on active area, expand the polygons by an amount equal to the overlay tolerance and convolute with resulting polygons with a Gaussian function that smears the edges thus providing a more realistic, continuos transition consistent with the Gaussian distribution typically found for overlay errors. This additional yield mechanism is illustrated in FIG. 11B.

Figure 12:
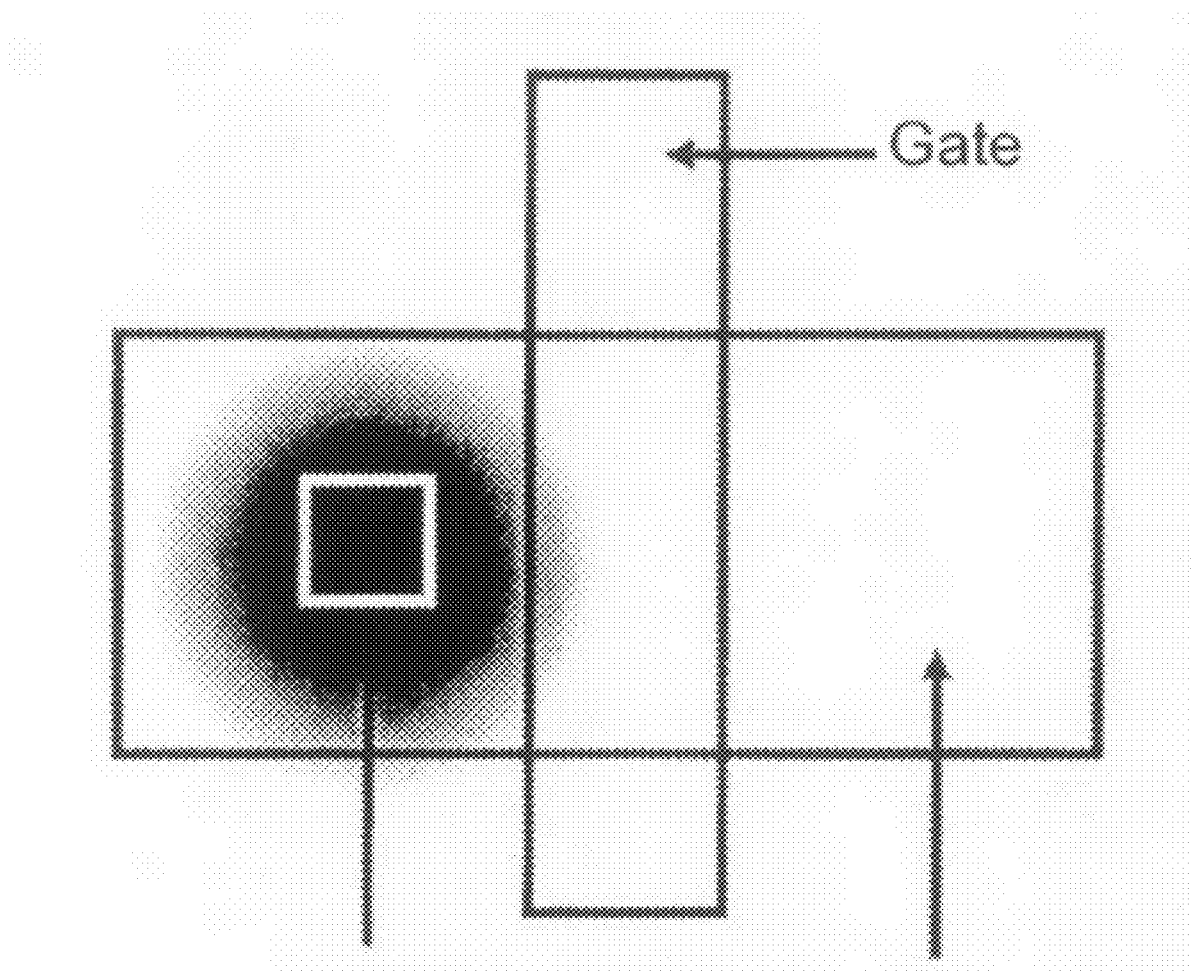
FIG. 12 illustrates an example of a diffusion contact failure mode.

Similar to the case encountered for the metal line end over a contact, there is a failure mechanism where the diffusion contact of a transistor becomes too close to the active gate. An example of this is shown in FIG. 12. Shown in this example is part of a typical transistor layout with diffusion region or active area, a diffusion contact and a gate. Superimposed in grayscale, as in the previous examples is the yield function for the gate contours which is low in the vicinity of the contact and increases away from the diffusion contact. This yield function accounts for failure of the transistor circuit due to an electrical short between the gate and diffusion contact. Additionally it may take into account the increasing capacitive coupling between the contact and the gate poly as the contact approaches the gate.

Figure 13:
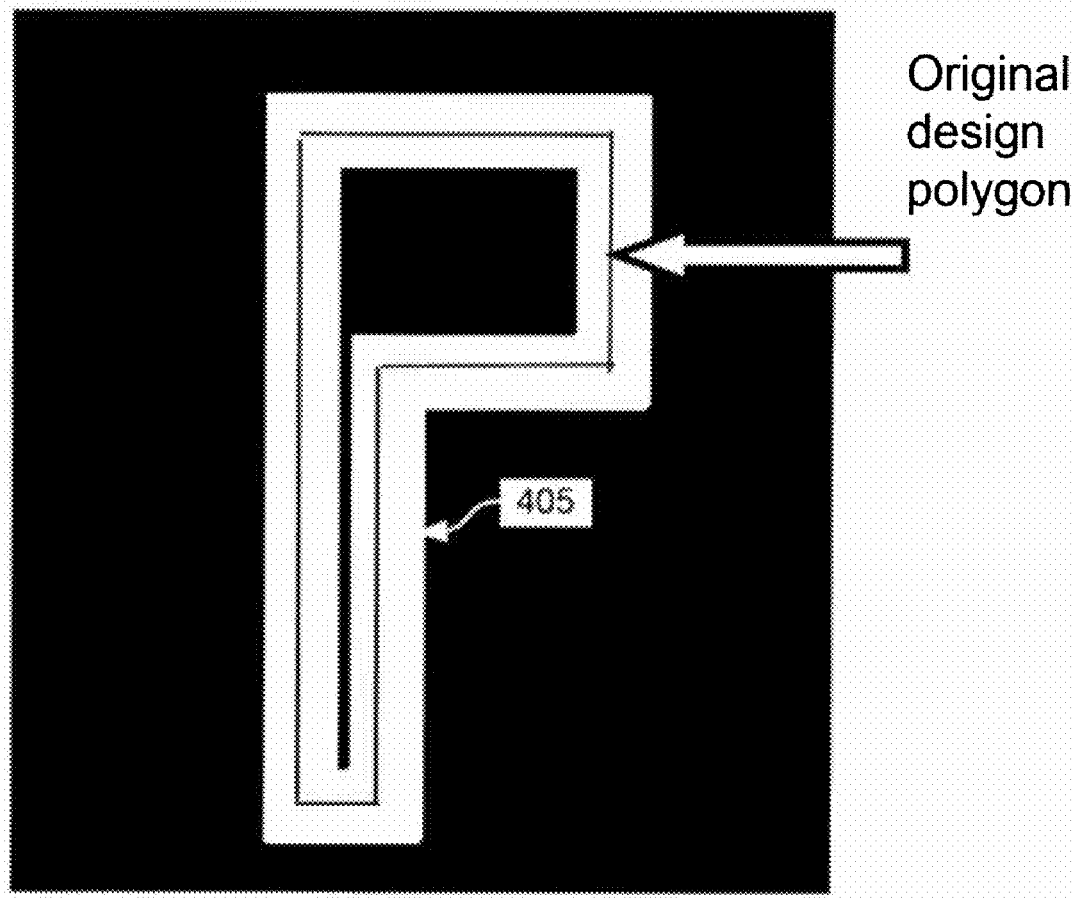
FIG. 13 illustrates an example of limits for a yield function according to one embodiment of the present invention.

While modifying layouts, it is a common concern that too large of a deviation from the original design should be avoided, and the designer typically intends to restrict the target point movement. This concept can be expressed in a fashion similar to the yield functions by defining a function that is 1 in the vicinity of the original layout polygon and drops to zero if the distance reaches or exceeds the desired maximum distance allowed for a target point movement. An example of this concept is illustrated in FIG. 13. In this example, a simple design polygon is shown and a yield function 450 is provided that implements boundary conditions restricting the maximum possible target point movement. A further refinement of this concept is to modify the allowed distance based for example on the presence of other layer.

In another embodiment, a method can be provided for combining various yield functions. This aspect was been briefly mentioned above where the user is given the ability select various yield functions and their corresponding parameters. This aspect might be implemented so as to allow construction of a software environment that can be expanded in a modular fashion to accommodate future needs and non anticipated yield loss mechanisms. As the yield loss is essentially a statistical problem, the combined probability of a working circuit is determined by multiplying the probabilities for a working circuit under the individual yield loss mechanisms. The combined yield function is created by locally multiplying the values of the yield function due to each individual loss mechanism.

Figure 14:
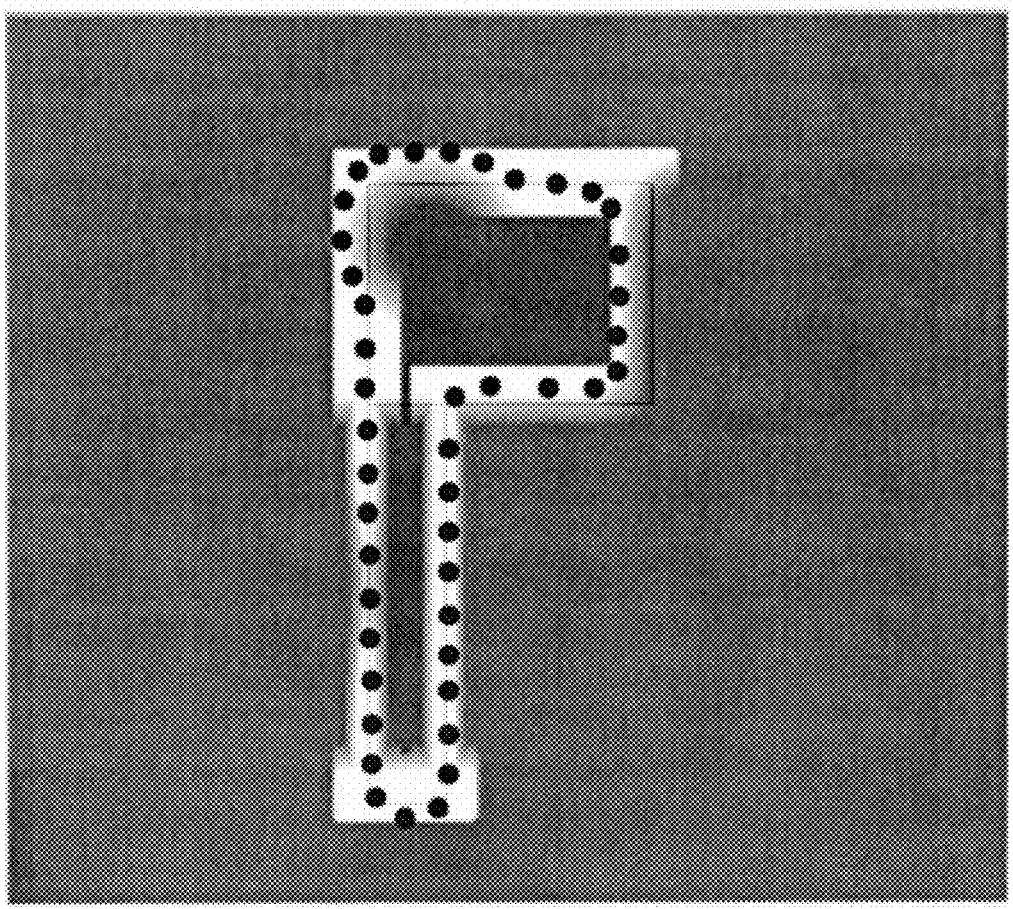
FIG. 14 illustrates an example of a yield function being implemented according to one embodiment of the present invention.

In one embodiment, in addition to providing a means to move target points to achieve an optimized layout, the invention can be implemented to mark layout configurations where a movement of the target points does not result in an acceptable yield. Such a scenario is shown in the example illustrated in FIG. 14, which displays the same yield function shown in FIG. 6A and is derived from the various yield mechanisms. The arrow in FIG. 14 marks a location where the yield function is relatively low and very little target point movement has occurred. This situation is created by the fact that the target points for the gate over the active region can not move significantly as the proper gatewidths needs to be maintained to ensure low enough leakage. At the same time the diffusion contact is too close to the gate and affects the yield for example due to possible shorts between gate and the diffusion contact. Under these circumstances, there is no reasonable resolution of the issue and the target points remain in a region of depressed yield. A straightforward yield checker based on a threshold algorithm can be implemented. This simple algorithm will flag target points that are in regions where the yield function is below a certain threshold value.

Figure 15:
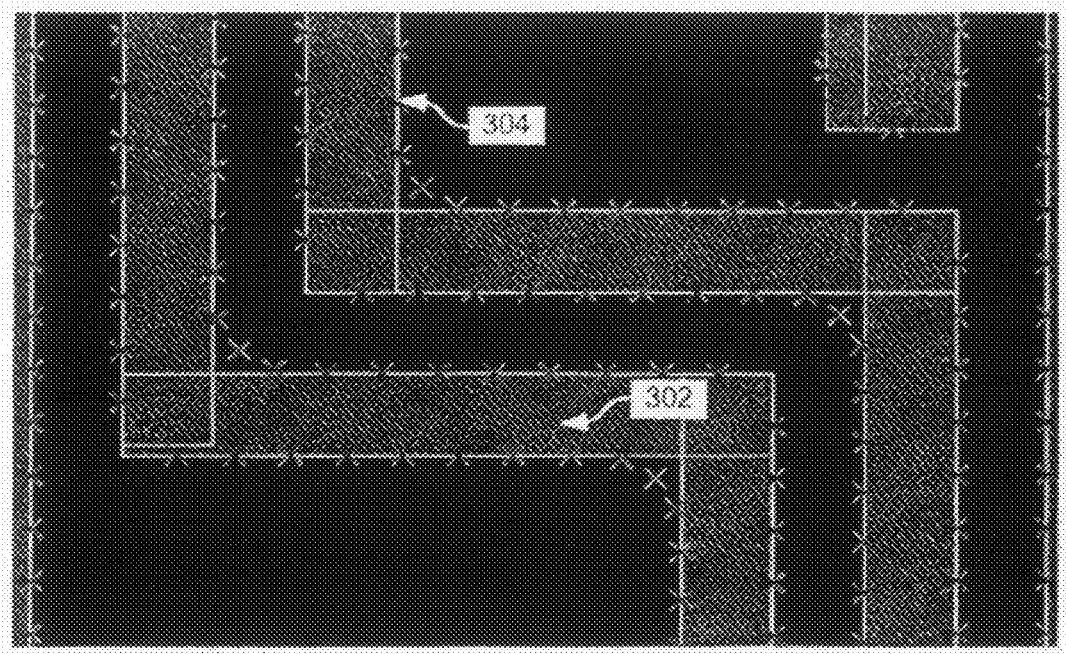
FIG. 15 illustrates an example of target point layout according to one embodiment of the present invention.

In another embodiment, the invention can be implemented to allow layout modifications with respect to intralevel fails. The examples of intralevel fails provided are primarily lithographic printing issues, where the pattern due to dose and focus variations becomes distorted to the extent that they can no longer provide their intended functionality. In this case a yield function is only defined at the current location of the target points. FIG. 15 shows a typical layout scenario as it may be present in a backend routing layer. The design polygons 302 are shown and in this example are assumed to have line widths of approximately 70 nm. Example target points 304 placed in this example include corner rounding.

In one embodiment of the invention, the yield function is calculated based on the focus induced shift of the wafer contour. Large focus induced shifts are indicative of a process instability and thus a potential yield loss mechanism. The procedure used in one embodiment is to perform OPC using the initial target point placement such as the one shown in FIG. 15. For the execution of OPC, knowledge of certain process parameters might be required. This might include, for example, knowledge of the numerical aperture of the exposure system, the illumination pattern chosen, a value for the dose to clear and certain resist parameters. All this information is encoded in a process model. The information for this model may have been obtained using a model calibration that involves the collection of wafer data and a model fit. In general the techniques and procedures for calibrating process model files and executing OPC are known to those skilled in the art.

Figure 16:
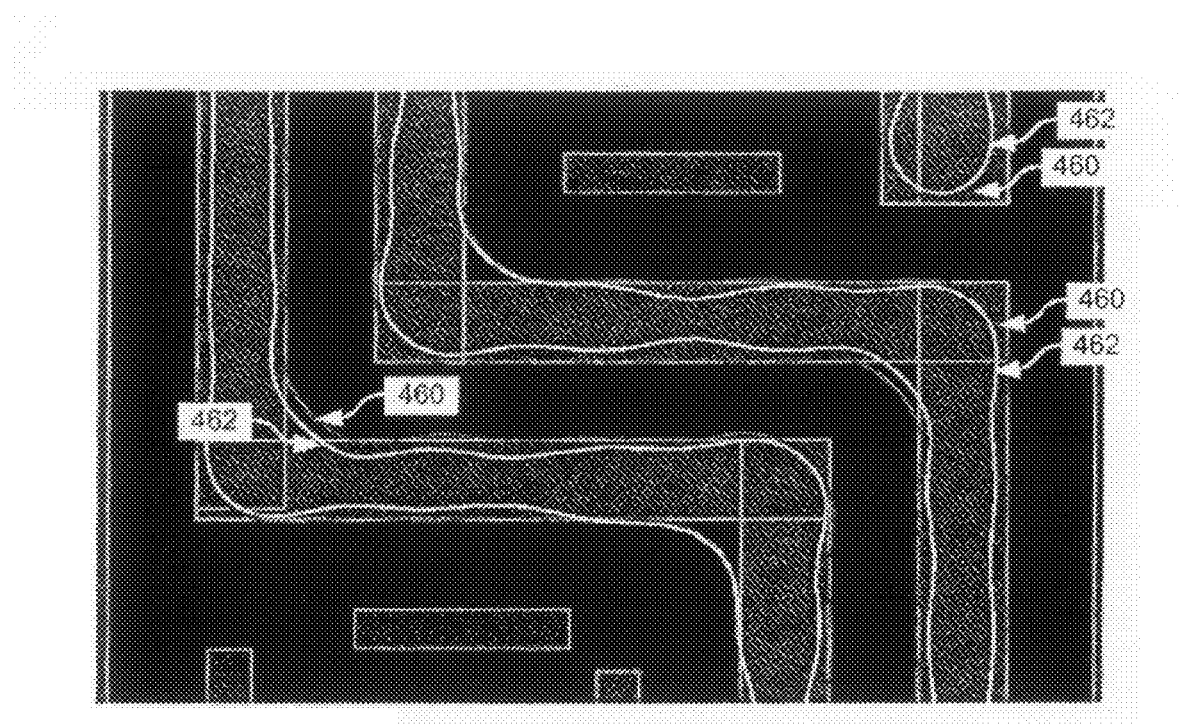
FIG. 16 illustrates an example of a simulated contour using target points of FIG. 15 according to one embodiment of the present invention.

Once OPC has been performed a set of mask polygons is obtained that can be used to simulate the wafer contours under different exposure conditions such as a nominal exposure condition and a defocused condition. The contours obtained in this fashion are shown in FIG. 16, with a nominal condition 460 and a defocused condition 462 shown. The optical conditions in this example are a numerical aperture of 0.93, an exposure wavelength Of 193 nm and a c-quad illumination. The defocus value chosen is 125 nm. A preferable choice for the defocus value is determined by the focus budget for the technology. As is evident from this example, the focus induced shift of the contour is not uniform along the entire polygon. Areas of significant change can be seen. These large deviations are indicative of a potential yield loss as the line width of the electrical connection is narrowing significantly and thus there is the risk of a potentially complete failure. Once the contour shift has been determined the target points 304 can be moved in the direction opposite to the focus induced contour shift and by an amount that is related to the size of the contour shift to compensate for this error. Several empirical relationships between the amount of contour shift and the amount of target point shifts may be used. Empirical techniques may be employed to obtain the most efficient target point movement based on an analysis of layout situations similar to the ones encountered in FIG. 16.

Figure 17:
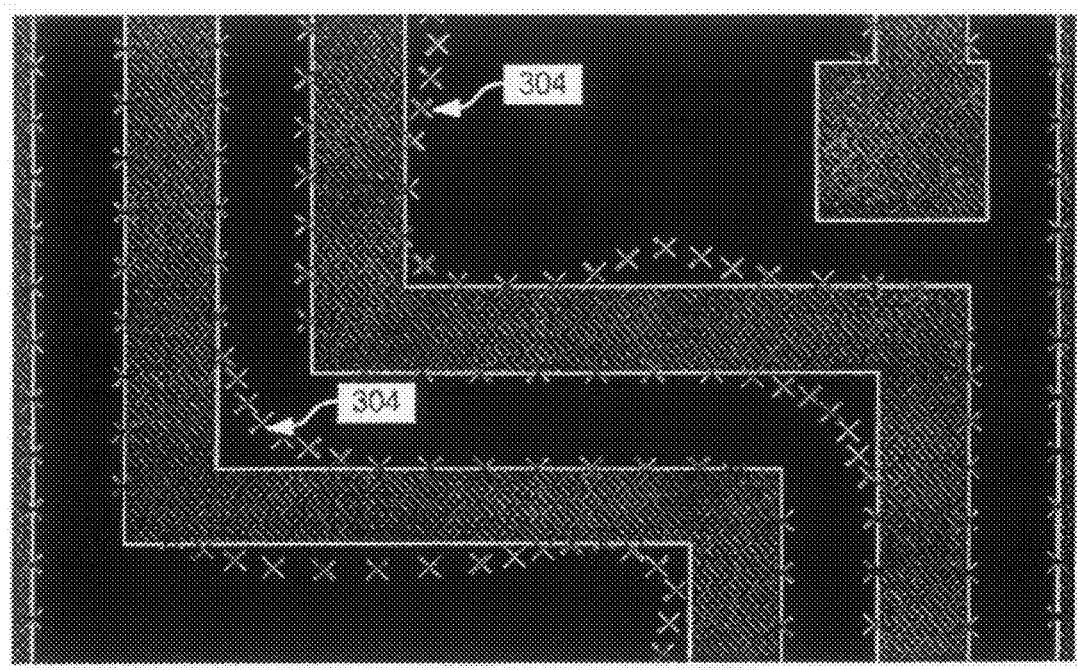
FIG. 17 illustrates an example diagram of target point adjustment according to one embodiment of the present invention.
Figure 18:
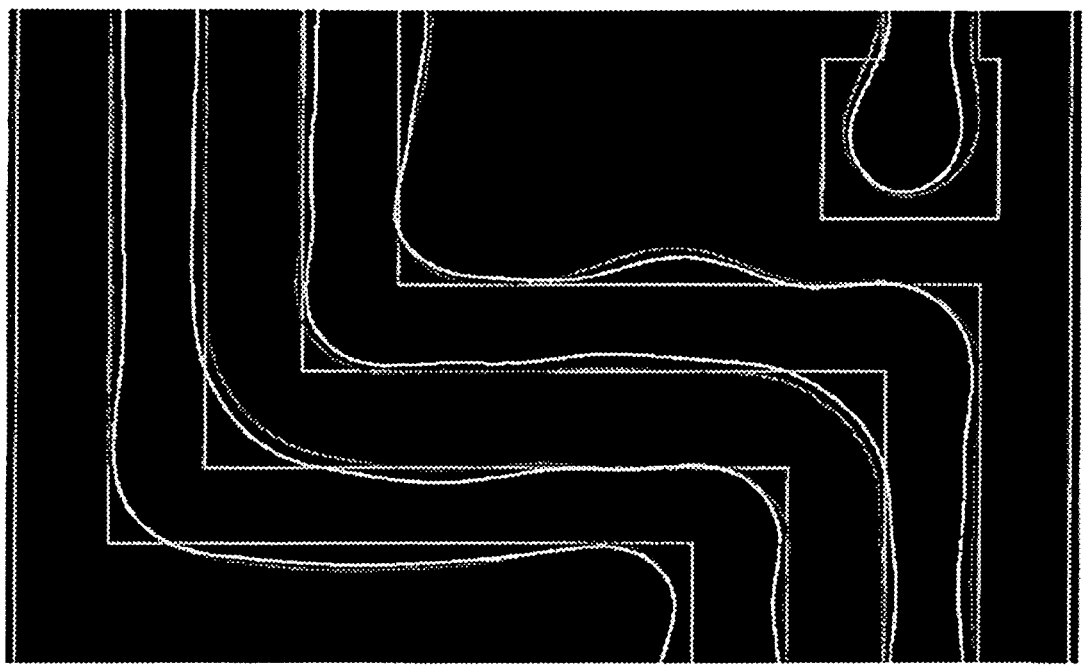
FIG. 18 illustrates an example of a simulated contour using target points of FIG. 17 according to one embodiment of the present invention.

In another embodiment of the invention, target point movement is not applied if the target point movement results in a critical dimension that lies below a minimum applied value. For example no target point movement is applied to the regions that are marked with yellow arrows in FIG. 16. Based on these contour shifts, a modified target point placement is achieved, the direction of the target point movement is opposite to the direction of the focus induced contour shift, the magnitude of the shift in this particular example is chosen to be linear with the amount of contour shift. An example of a resulting target point placement is shown in FIG. 17. The improvement in terms of the focus sensitivity is demonstrated in FIG. 18, where it can be seen that the defocused result is more closely aligned with the nominal condition. Based on the new target point locations in the same fashion as outlined above the new contours have been calculated at nominal and at a defocused condition. It can be seen that the amount of focus induced variation is smaller than with the prior target point placement and in particular most locations where the overall line width is significantly smaller than the as designed line width have been eliminated. This situation is desirable as the subgroundrule linewidths not only result in an increased resistivity but are also more prone to reliability fails (electromigration) in areas where the current densities are high.

As noted, once the yield functions have been defined, in one embodiment a procedure or algorithm is implemented that allows target point movement towards a region of optimized yield. One embodiment of the invention has already been discussed in the context of yield functions. The solution described in that embodiment is a non-iterative solution that is typically used if there are no significant intralevel yield mechanisms where the yield function is only defined at the target point locations but not in the entire two-dimensional domain.

In another embodiment of the invention the target point optimization progresses in an iterative fashion. Using the combined yield function for the interlevel fails the local first derivative of the yield function with respect to spatial displacement can be calculated. Based on this derivative, which provides a magnitude and a direction of this local derivative, the next position for the target point can be calculated. In the case of intralevel fails, a local derivative can not be calculated as the target point function is only defined at the local target point locations. In this case, a more empirical approach is disclosed. The direction of the target point movement is determined by the direction in which the wafer contour moves under defocus. The magnitude of the movement may be derived from the magnitude of the focus induced contour shift. The relationship between the magnitude of the shift and the focus-induced contour displacement may be a linear one in its simplest case even though more complex relationships may be required.

In one embodiment, this procedure allows combining both intralevel and interlevel fail mechanisms and incorporate them in one combined optimization algorithm. For each target point the magnitude and direction of the target point movement may be calculated based on the procedure outlined above. Thus for each target point two values are obtained and they are added in a vector addition to provide the next position for the target point placement. Once concluded for all target points a new iteration starts. For this new iteration the yield function for the intralevel fails have to be recalculated based on the new target point placements. A variety of stop criteria might be implemented as suitable to terminate the loop. Stopping may be induced, for example, by exceeding a fixed number of iterations, where the target point has reached a region where the yield is high enough, or when the shifts incurred at a new step have dropped below a certain threshold.

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for modifying an integrated circuit design layout, comprising:
    using a computer system to place a plurality of target points in proximity of a polygon representing a portion of an integrated circuit design;
    modifying the target point placement for some or all of the placed target points using a yield function;
    fitting a curve to the target points; and
    redefining the portion of the integrated circuit as a contour defined by the curve to modify the design layout.

2. The method of claim 1, wherein the modified design layout is used as a target for an optical proximity correction algorithm.

3. The method of claim 1, wherein placing comprises placing the target points on the perimeter of the polygon representing the portion of the integrated circuit design.

4. The method of claim 1, further comprising accepting user input identifying target point placement modification.

5. The method of claim 1, further comprising determining the yield function of the integrated circuit design.

6. The method of claim 5, wherein the yield function is determined using a single design layer or multiple design layers of the circuit design.

7. The method of claim 5, wherein the yield function is based on overlay, printability, planarization, material fill, or electrical properties.

8. The method of claim 5, wherein the yield function is described by an error function as:

$$Y(x) = \frac{1}{2}\left(1 + erf\left(\frac{x-\mu}{2\sigma}\right)\right)$$

where μ is the position of a contact edge, x is the position of a metal edge and the positive direction is defined as being from the center of the contact to the edge of the contact.

9. The method of claim 1, wherein modifying target point placement is performed iteratively.

10. The method of claim 1, wherein modified target point placement is determined to improve manufacturability of the circuit design.

11. A circuit design optimization tool comprising computer executable program code on a computer readable medium configured to cause a processor to perform the functions of:
   placing a plurality of target points in proximity of a polygon representing a portion of an integrated circuit design;
   modifying the target point placement for some or all of the placed target points using a yield function;
   fitting a curve to the target points; and
   redefining the portion of the integrated circuit as a contour defined by the fitted curve to modify the design layout.

12. The circuit design optimization tool of claim 11, wherein the modified design layout is used as a target for an optical proximity correction algorithm.

13. The circuit design optimization tool of claim 11, wherein placing comprises placing the target points on the perimeter of the polygon representing the portion of the integrated circuit design.

14. The circuit design optimization tool of claim 11, further comprising accepting user input identifying target point placement modification.

15. The circuit design optimization tool of claim 11, further comprising determining a yield function of the integrated circuit design.

16. The circuit design optimization tool of claim 15, wherein the yield function is determined using a single design layer or multiple design layers of the circuit design.

17. The circuit design optimization tool of claim 15, wherein the yield function is based on overlay, printability, planarization, material fill, or electrical properties.

18. The circuit design optimization tool of claim 15, wherein the yield function is described by an error function as:

$$Y(x) = \frac{1}{2}\left(1 + erf\left(\frac{x-\mu}{2\sigma}\right)\right)$$

where μ is the position of a contact edge, x is the position of a metal edge and the positive direction is defined as being from the center of the contact to the edge of the contact.

19. The circuit design optimization tool of claim 11, wherein modifying target point placement is performed iteratively.

20. The circuit design optimization tool of claim 11, wherein modified target point placement is determined to improve manufacturability of the circuit design.

* * * * *

UNITED STATES PATENT AND TRADEMARK OFFICE
CERTIFICATE OF CORRECTION

| | | |
|---|---|---|
| PATENT NO. | : 7,784,019 B1 | Page 1 of 1 |
| APPLICATION NO. | : 11/934047 | |
| DATED | : August 24, 2010 | |
| INVENTOR(S) | : Franz Zach | |

It is certified that error appears in the above-identified patent and that said Letters Patent is hereby corrected as shown below:

In the Specification:

Column 5, line 30 - please delete the duplicate "into a".

Column 9, line 33 - "circle shown as the figure." should read --circle C shown as the figure--.

Column 9, line 38 - "diameter of the contact is equal…" should read --diameter of the contact C is equal…--.

In the Claims:

Claim 11 - column 17, line 27 should read as follows:

"defined by the fitted curve to modify the design layout" should be changed to --defined by the curve to modify the design layout--.

Signed and Sealed this

Sixteenth Day of November, 2010

David J. Kappos
*Director of the United States Patent and Trademark Office*